No. 780,975. PATENTED JAN. 31, 1905.
G. VANDE CASTEELE, FILS.
METHOD OF PREPARING FELTED HORSEHAIR.
APPLICATION FILED MAR. 3, 1900.
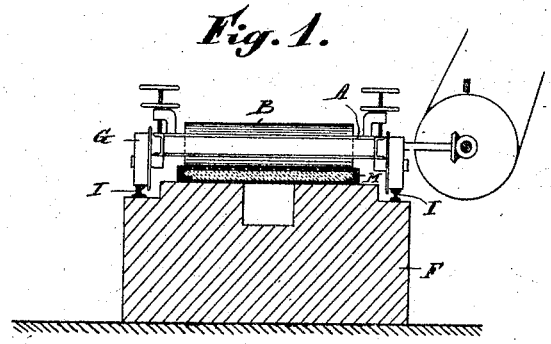
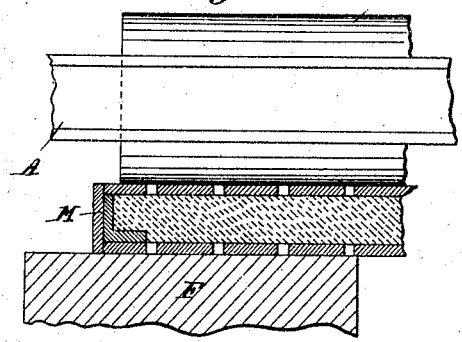
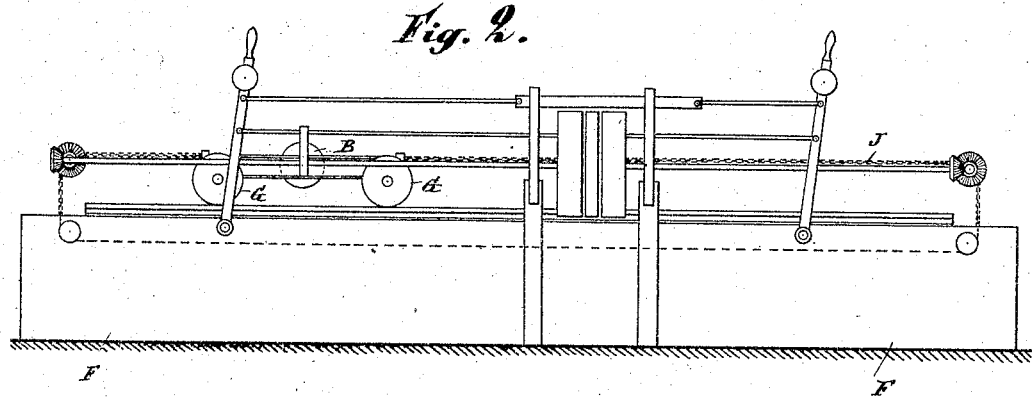
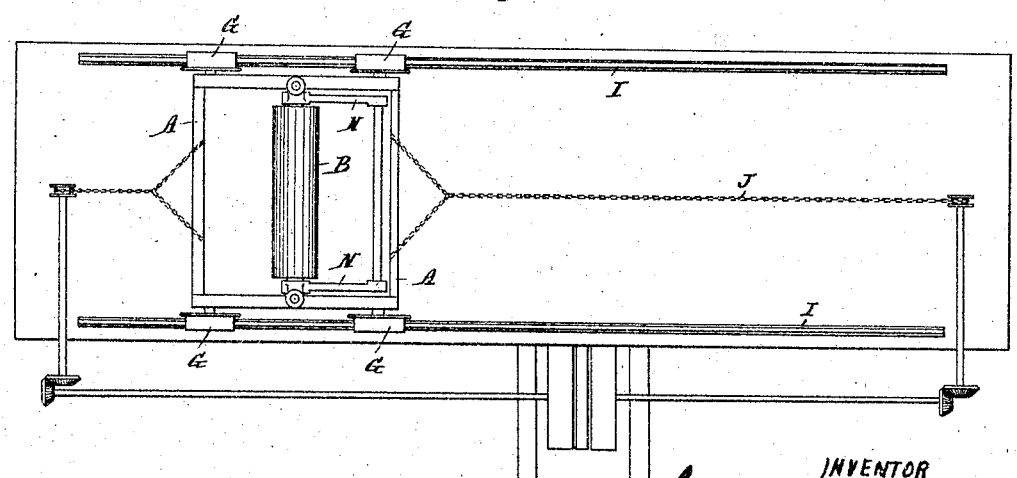
WITNESSES:
INVENTOR
Gustave Vande Casteele Fils
BY
ATTORNEYS No. 780,975. Patented January 31, 1905.

UNITED STATES PATENT OFFICE.

GUSTAVE VANDE CASTEELE, FILS, OF GHENT, BELGIUM.

METHOD OF PREPARING FELTED HORSEHAIR.

SPECIFICATION forming part of Letters Patent No. 780,975, dated January 31, 1905.

Application filed March 3, 1900. Serial No. 7,221.

*To all whom it may concern:*

Be it known that I, GUSTAVE VANDE CASTEELE, Fils, a subject of the King of Belgium, and a resident of 71 Rue des Rémonleurs, Ghent, Belgium, have invented a certain new and useful product called "Felted Horsehair" and its Mode of Preparation, of which the following is a specification.

This invention has for its object a new industrial product which I term "felted horsehair" and the special mode of preparing this product.

The horsehair usually employed for stuffing furniture, mattresses, &c., is found or is well known in commerce in curls, according to the trade-name "frizzed" or "crisped" horsehair.

The felted horsehair which is the object of my invention is precisely intended to take the place of frizzed horsehair. It is in the form of bats of various thickness and size. These bats are composed of horsehair from all sources in mixtures suitable to the production of bats and are felted by compression with or without previous cementing by means of presses or cylinders in molds or frames or by any other means for attaining the same object, the bats thus obtained being then cut by cutting-punches to any desired size.

The advantages of felted horsehair over the frizzed horsehair are enormous.

The felted horsehair dispenses with all the work of stuffing by hand, as it is in the form of bats of all sizes—that is to say, of the lengths, breadths, and thicknesses—of seats, backs, mattresses or parts thereof, linings under carpets, &c., which they are to supply, fill, or constitute, and consequently that without any manipulation whatever fillings are obtained regularly stuffed at all points and of the same elasticity throughout, such as cannot be obtained with frizzed horsehair except by careful and expensive manipulation. Moreover, whatever care be taken in stuffing by hand, the frizzed horsehair in a short time loses its curl and much of its elasticity. The felted horsehair, on the other hand, presents permanent elasticity. Finally, the felted horsehair allows hairs shorter and cheaper to be employed, which in order that they may be felted and regularly interlaced should be in every respect sufficiently short and even, when necessary cut in pieces, before being carded.

The process of manufacture is as follows: It is stated above that the felted horsehair is in the form of bats of various size and thickness, composed of hairs from all sources in suitable mixtures and felted by compression by presses or cylinders in molds or frames. These frames are made of perforated metal plates or any suitable material. They are made square, rectangular, or circular, according to the bats to be produced. They may also be cylindrical or annular, so as to produce not bats but rolls or rings of compressed horsehair suitable for elastic tires for vehicles of all kinds. The frame has a flange of angle-iron, the height of which determines the thickness of the bat. The cover is also made of perforated plate, the bottom and the cover being strengthened by iron cross-bars. After suitable mixture the horsehair is packed into the frame and subjected to steaming, which heats and moistens it. After or without cementing, as the case may be, the hair is compressed, either cold or hot, in the frame and then left till it is quite dry. By the above-described treatment is effected a curling or interlacing of the fibers, which transforms the material, which is not coherent when laid in the frame, into a compact homogeneous bat having permanent elasticity, greatly superior to that of a cushion of frizzed horsehair of the same thickness, and presenting the appearance and consistence of a felt.

In the accompanying drawings, Figure 1 represents a front view of the apparatus, partially in section. Fig. 2 represents a longitudinal view, and Fig. 3 is a diagram view, of the apparatus. Fig. 4 represents an enlarged front view, partly in section, with parts broken away.

The apparatus consists, essentially, of a frame carrying the frame or mold M, intended to hold the horsehair. Over this frame rolls the frame A, which has a reciprocating movement and carries the presser-roller B, whose position in height can be regulated at will in accordance with the horsehair plates to be obtained and which can be mounted for that purpose on the articulated arms N. The frame A rolls on the rails I, arranged on the sides of the frame by means of pulleys G, and it has a reciprocating movement produced by some suitable mechanism by the intermediary of the chain J passing under the mold in a suitable cavity provided in the frame.

Having thus described the nature of this invention and the best means I know for carrying the same into effect, I claim—

A process for making compressed hair, consisting in mixing bits of horsehairs from all sources and of all grades, depositing them into a mold, subjecting the mass to the softening action of steam, sizing it by means of an appropriate cement, and finally compressing it sufficiently to obtain a product having a high degree of compactness, homogeneity and permanent elasticity, substantially as described.

In witness whereof I hereunto set my hand in presence of two witnesses.

GUSTAVE VANDE CASTEELE, Fils.

Witnesses:
 Ed. V. Lirionet,
 Gregory Phelan.